(12) United States Patent
Yamane et al.

(10) Patent No.: US 12,328,004 B2
(45) Date of Patent: Jun. 10, 2025

(54) POWER CONTROL SYSTEM, POWER SUPPLY INSTRUCTION SYSTEM, AND POWER CONTROL METHOD

(71) Applicant: Mitsubishi Electric Corporation, Tokyo (JP)

(72) Inventors: Keisuke Yamane, Tokyo (JP); Shunsuke Kawano, Tokyo (JP); Tomihiro Takano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 48 days.

(21) Appl. No.: 18/287,474

(22) PCT Filed: Apr. 28, 2021

(86) PCT No.: PCT/JP2021/017039
§ 371 (c)(1),
(2) Date: Oct. 19, 2023

(87) PCT Pub. No.: WO2022/230128
PCT Pub. Date: Nov. 3, 2022

(65) Prior Publication Data
US 2024/0388097 A1 Nov. 21, 2024

(51) Int. Cl.
*H02J 3/38* (2006.01)
*H02J 3/00* (2006.01)
*H02J 3/16* (2006.01)

(52) U.S. Cl.
CPC .............. *H02J 3/38* (2013.01); *H02J 3/003* (2020.01); *H02J 3/004* (2020.01); *H02J 3/16* (2013.01)

(58) Field of Classification Search
CPC .... H02J 3/38; H02J 3/003; H02J 3/004; H02J 3/16; H02J 13/00; H02J 3/381; H02J 3/00; G05F 1/66; G05B 15/02
(Continued)

(56) References Cited

U.S. PATENT DOCUMENTS

2014/0094985 A1* 4/2014 Hibiya ................... G05B 15/02
700/297
2016/0170426 A1* 6/2016 Dzafic ....................... H02J 3/16
700/297
(Continued)

FOREIGN PATENT DOCUMENTS

EP 1 933 441 A1 6/2008
JP 2014-128140 A 7/2014
(Continued)

OTHER PUBLICATIONS

International Search Report and Written Opinion mailed on Jul. 6, 2021, received for PCT Application PCT/JP2021/017039, filed on Apr. 28, 2021, 9 pages including English Translation.
(Continued)

*Primary Examiner* — Rexford N Barnie
*Assistant Examiner* — Swarna N Chowdhuri
(74) *Attorney, Agent, or Firm* — XSENSUS LLP

(57) ABSTRACT

Voltage in a power transmission-distribution system is managed by calculating a power control amount of a distributed energy resource in consideration of the whole power transmission-distribution system. A power control system includes: a power distribution system contraction unit contracting the power distribution system including the distributed energy resource in a point of a power transmission system using control power amount range, and calculating a contraction control power amount range; a contraction power amount calculation unit calculating a contraction power amount to satisfy the contraction control power amount range based on a power transmission system evaluation value; a power control amount calculation unit calculating a power control amount controlled by the distributed energy resource based on the contraction power amount and a power distribution system evaluation value; and a com-
(Continued)

munication unit transmitting the power control amount to the distributed energy resource.

11 Claims, 14 Drawing Sheets

(58) Field of Classification Search
USPC .......................... 307/24; 700/296, 297, 298
See application file for complete search history.

(56) References Cited

U.S. PATENT DOCUMENTS

| | | | |
|---|---|---|---|
| 2016/0172857 A1* | 6/2016 | Itaya | G05B 15/02 |
| | | | 700/298 |
| 2016/0204609 A1* | 7/2016 | Tyler | H02J 3/16 |
| | | | 700/298 |
| 2018/0351361 A1 | 12/2018 | Miyake et al. | |
| 2021/0391721 A1* | 12/2021 | Ishihara | H02J 3/16 |
| 2022/0149631 A1* | 5/2022 | Suzuki | H02J 3/466 |

FOREIGN PATENT DOCUMENTS

| | | |
|---|---|---|
| JP | 2021-019486 A | 2/2021 |
| WO | 2017/086099 A1 | 5/2017 |

OTHER PUBLICATIONS

Notice of Reasons for Refusal mailed on Jan. 11, 2022, received for JP Application 2021-573282, 5 pages Including English Translation.
Extended European Search Report issued Jun. 19, 2024 in European Patent Application No. 21939289.1, 9 pages.

* cited by examiner

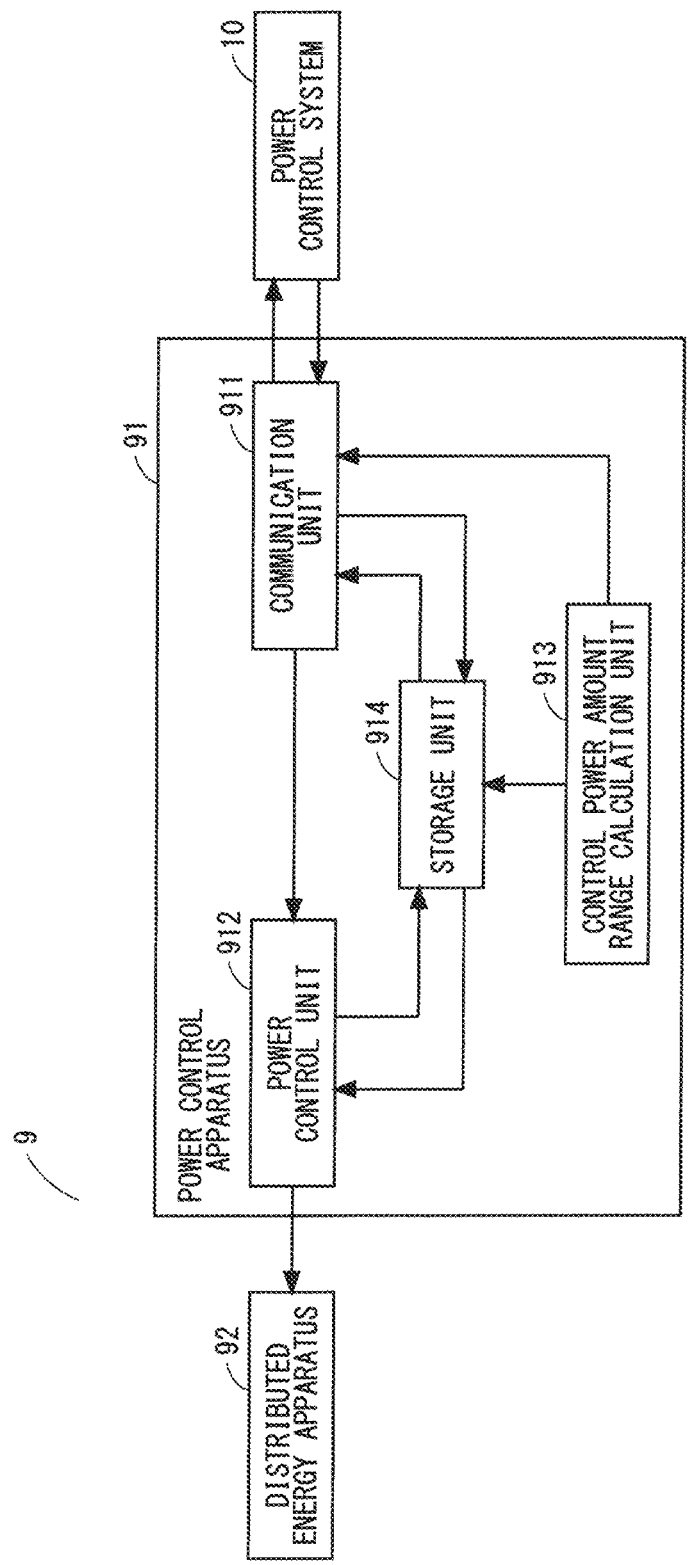
F I G. 4

F I G. 1 1
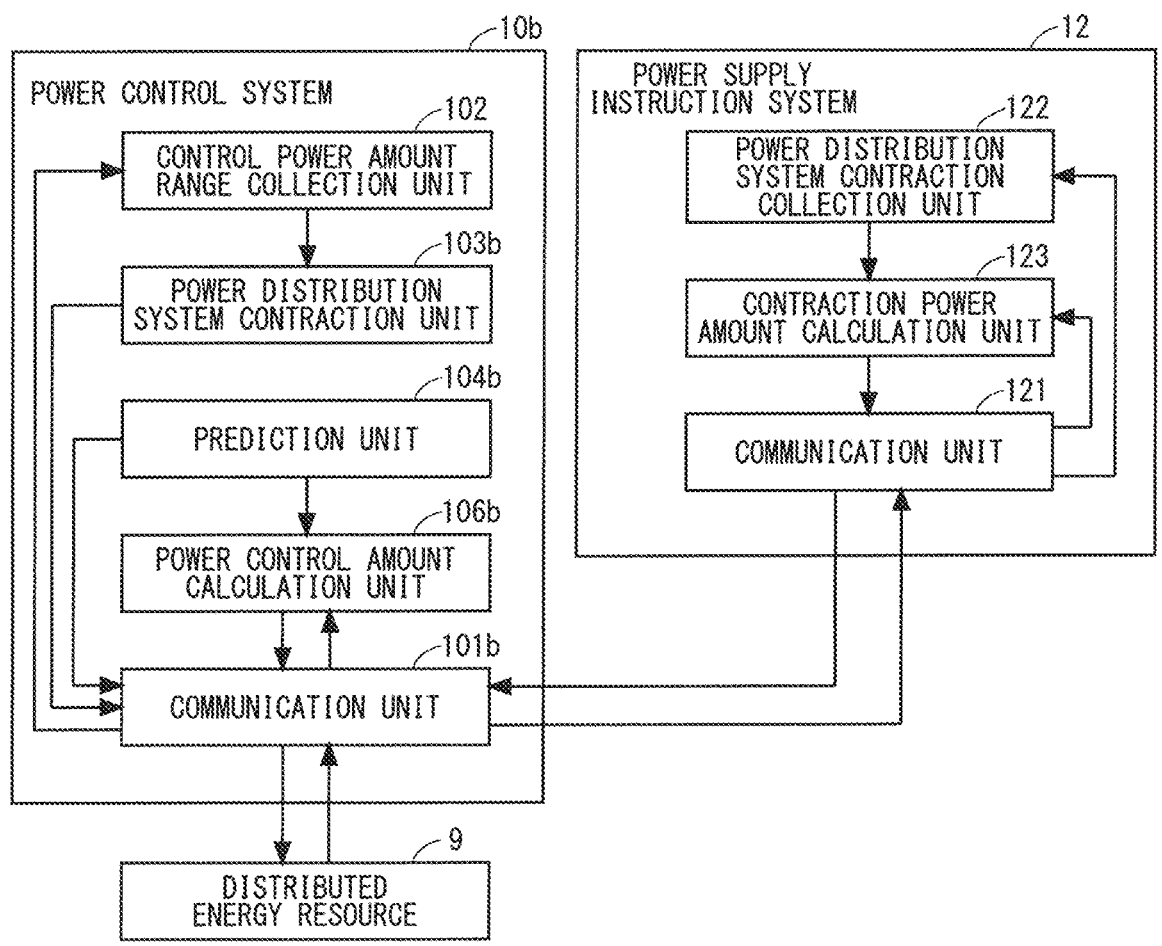

F I G. 1 3
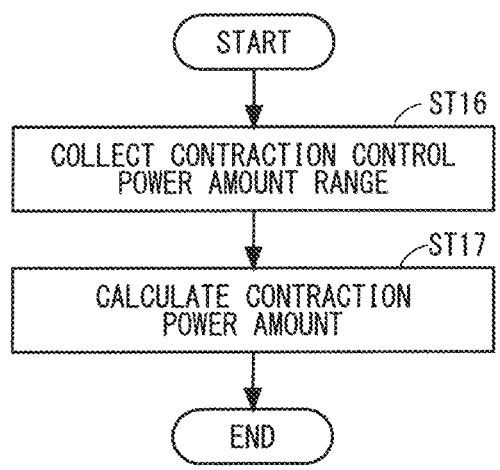

F I G. 1 4 A
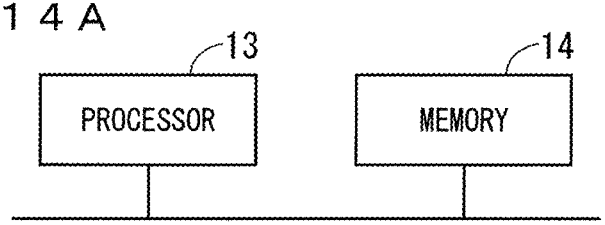
F I G. 1 4 B
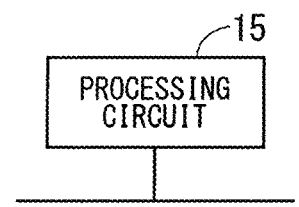

POWER CONTROL SYSTEM, POWER SUPPLY INSTRUCTION SYSTEM, AND POWER CONTROL METHOD

CROSS-REFERENCE TO RELATED APPLICATION

This application is based on PCT filing PCT/JP2021/017039, filed Apr. 28, 2021, the entire contents of which are incorporated herein by reference.

TECHNICAL FIELD

The present disclosure relates to a power control system controlling a distributed energy resource held by a plurality of consumers, a power supply instruction system communicably connected to the power control system, and a power control method of controlling the distributed energy resource.

BACKGROUND ART

In a power transmission-distribution system, a relatively small distributed energy resource dispersedly introduced in a region near consumers becomes popular. The distributed energy resource includes a solar power generation, a wind-power generation, a secondary cell, an electric automobile, and a heat pump, for example. These distributed energy resources are increased, thus an electrical power flow in a power transmission-distribution system is changed, and there is concern that voltage in the power transmission-distribution system is hard to manage.

Patent Document 1 discloses a voltage reactive power control system managing voltage of a power transmission system.

PRIOR ART DOCUMENTS

Patent Document(s)

Patent Document 1: International Publication WO 2017/086099

SUMMARY

Problem to be Solved by the Invention

The voltage reactive power control system in Patent Document 1 includes a voltage reactive power distribution calculation unit for controlling a power transmission system, and has a function of calculating a power control amount of a reactive power apparatus cooperating with a power transmission system or a large-scale power generator such as thermal power generation by optimum flow calculation, but does not consider a distributed energy resource cooperating with a power distribution system. Actually, a power control amount of the distributed energy resource needs to be calculated in consideration of the whole power transmission-distribution system. An appropriate power control amount needs to be searched in combination of the power transmission system and the power distribution system interconnected to the power transmission system, thus calculation load increases, and large amount of calculation time is necessary.

The present disclosure is to solve the above problems, and an object is to provide a power control system, a power supply instruction system, and a power control method capable of efficiently calculating a power control amount in consideration of a whole power transmission-distribution system and reducing calculation load.

Means to Solve the Problem

A power control system according to the present disclosure includes: a control power amount range collection unit collecting a control power amount range which is a control range of an active power amount and a reactive power amount of a distributed energy resource connected to a power distribution system; a power distribution system contraction unit contracting the power distribution system including the distributed energy resource in a power transmission system point to make the power distribution system serve as a contraction power distribution system using the control power amount range, and calculating a contraction control power amount range which is a control range of an active power amount and a reactive power amount of the contraction power distribution system; a contraction power amount calculation unit calculating a contraction power amount made up of an active power amount and a reactive power amount of the contraction power distribution system to satisfy the contraction control power amount range based on a power transmission system evaluation value indicating evaluation of a state of a power transmission system; a power control amount calculation unit calculating a power control amount made up of an active power amount and a reactive power amount controlled by the distributed energy resource based on the contraction power amount and a power distribution system evaluation value indicating evaluation of a state of the power distribution system; and a communication unit transmitting the power control amount to the distributed energy resource.

A power supply instruction system according to the present disclosure is a power supply instruction system performing communication with the power control system, including: a power distribution system contraction collection unit collecting the contraction control power amount range from the power control system; and a contraction power amount calculation unit calculating the contraction power amount.

A power control method according to the present disclosure is a power control method in a power control system controlling a distributed energy resource connected to a power distribution system, including steps of: collecting a control power amount range which is a control range of an active power amount and a reactive power amount of the distributed energy resource; contracting the power distribution system including the distributed energy resource in a power transmission system point to make the power distribution system serve as a contraction power distribution system using the control power amount range, and calculating a contraction control power amount range which is a control range of an effective power amount and a reactive power amount of the contraction power distribution system; calculating a contraction power amount made up of an active power amount and a reactive power amount of the contraction power distribution system to satisfy the contraction control power amount range based on a power transmission system evaluation value indicating evaluation of a state of a power transmission system; calculating a power control amount made up of an active power amount and a reactive power amount controlled by the distributed energy resource based on the contraction power amount and a power distribution system evaluation value indicating evaluation of a state of the power distribution system; and transmitting the power control amount to the distributed energy resource.

Effects of the Invention

According to the present disclosure, the power control system, the power supply instruction system, and the power control method contract the power distribution system in the power transmission system point to make it serve as the contraction power distribution system, and calculate the power control amount in consideration of the contraction power distribution system and the power transmission, thus can efficiently calculate the power control amount, and can reduce calculation load.

BRIEF DESCRIPTION OF DRAWINGS

FIG. 4 A block diagram illustrating an example of a configuration of a distributed energy resource according to the embodiments 1 to 3.

FIG. 11 A block diagram illustrating an example of a configuration of a power control system and a power supply instruction system according to the embodiment 3.

FIG. 13 A flow chart illustrating an example of an operation of the power supply instruction system according to the embodiment 3.

FIGS. 14A and 14B Drawings illustrating a hardware configuration of the power control system and the power supply instruction system according to the embodiments 1 to 3.

DESCRIPTION OF EMBODIMENT(S)

Embodiment 1

Figure 1:
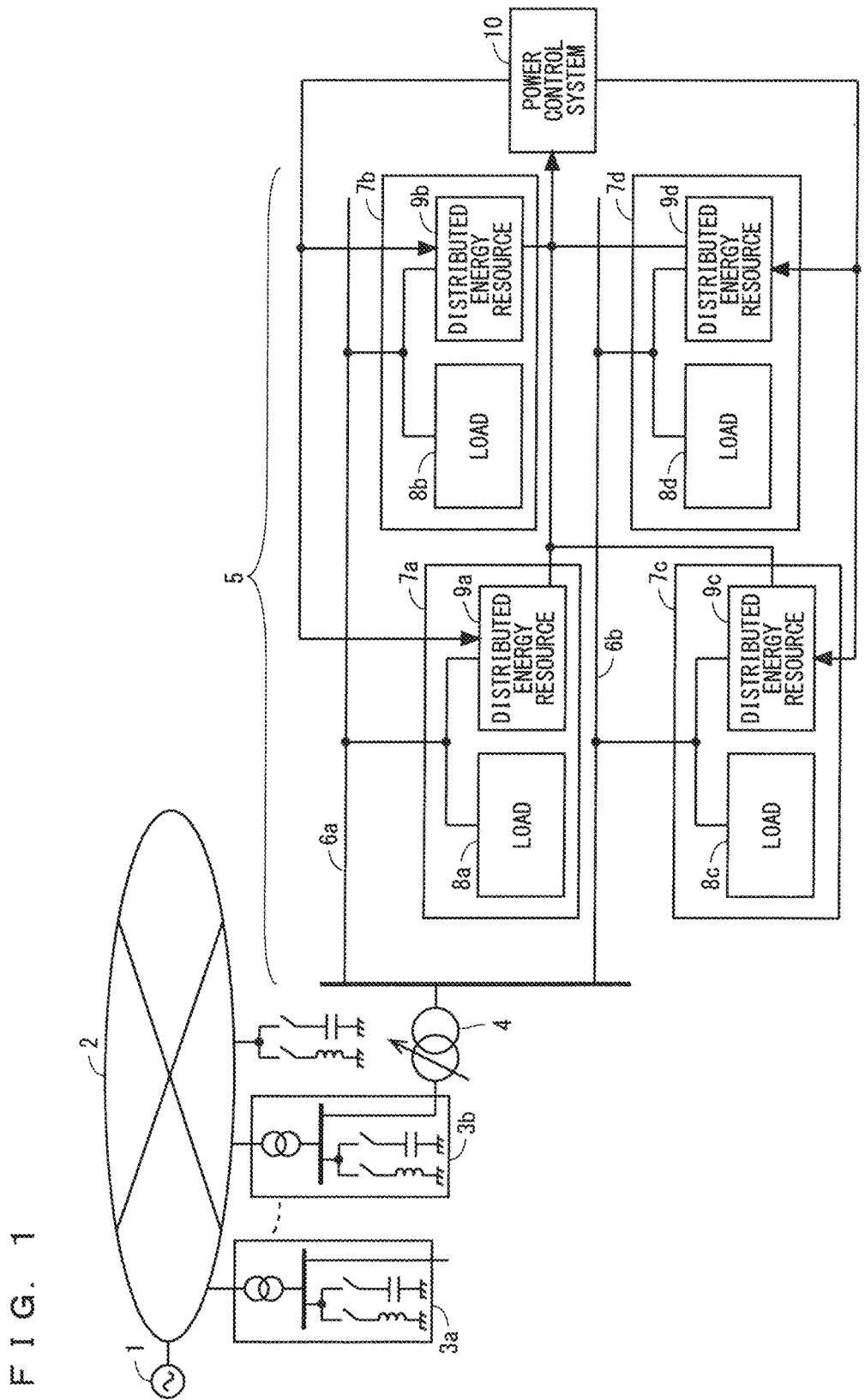
FIG. 1 A drawing illustrating an example of a configuration of a whole power transmission-distribution system according to an embodiment 1.

FIG. 1 is a drawing illustrating an example of a configuration of a whole power transmission-distribution system according to an embodiment 1. As illustrated in FIG. 1, the power transmission-distribution system includes a large-scale power generation facility 1 such as a thermal power plant, a power transmission system 2, voltage reactive power control devices 3a and 3b controlling voltage of the power transmission system 2, a substation load ratio-control transformer (LRT) 4 interconnected to a power distribution substation, a power distribution system 5, and a power control system 10.

The large-scale power generation facility 1 supplies active power and reactive power to the power transmission system 2. The voltage reactive power control devices 3a and 3b are provided with a reactor capacitor transforming voltage by an electrical transformer, thereby supplying the reactive power to control the voltage. The substation LRT 4 transforms the voltage, thereby controlling feed voltage of the power distribution system 5.

The power distribution system 5 is made up of a plurality of distribution lines 6a and 6b and consumer facilities 7a, 7b, 7c, and 7d connected to the distribution lines 6a and 6b. In FIG. 1, the consumer facilities 7a and 7b are connected to the distribution line 6a, and the consumer facilities 7c and 7d are connected to the distribution line 6b, however, the number of connection members is not limited thereto. The distribution lines 6a and 6b are connected to the substation LRT 4. When the distribution lines 6a and 6b are indicated without distinction, they are referred to as the distribution line 6 hereinafter.

The consumer facility 7a includes a load 8a and a distributed energy resource 9a. The distributed energy resource 9a includes an electrical control apparatus such as a power conditioner capable of outputting the active power and the reactive power. In the similar manner, the consumer facilities 7b, 7c, and 7d include loads 8b, 8c, and 8d and distributed energy resources 9b, 9c, and 9c, respectively. When the consumer facilities 7a, 7b, 7c, and 7d are indicated without distinction, they are referred to as the consumer facility 7 hereinafter. When the loads 8a, 8b, 8c, and 8d are indicated without distinction, they are referred to as the load 8. Furthermore, when the distributed energy resources 9a, 9b, 9c, and 9d are indicated without distinction, they are referred to as the distributed energy resource 9. In FIG. 1, the consumer facility 7a includes the load 8 and the distributed energy resource 9, but may include only one of the load 8 and the distributed energy resource 9. In the description hereinafter, the consumer facility 7 includes at least the distributed energy resource 9.

The power control system 10 collects a control power amount range which is a control range of an active power amount and a reactive power amount of the distributed energy resource 9 from each distributed energy resource 9. This control power amount range is a range in each distributed energy resource 9. In the case of FIG. 1, the control power amount range is a range in each of the distributed energy resources 9a, 9b, 9c, and 9d. The power control system 10 calculates the power control amount made up of the active power amount and the reactive power amount controlled by each distributed energy resource 9 using the control power amount range, and transmits the power control amount to each distributed energy resource 9. The power control system 10 is connected to the distributed energy resource 9 via communication network. The communication network may be Internet, dedicated network, or network using both of them.

Figure 2:
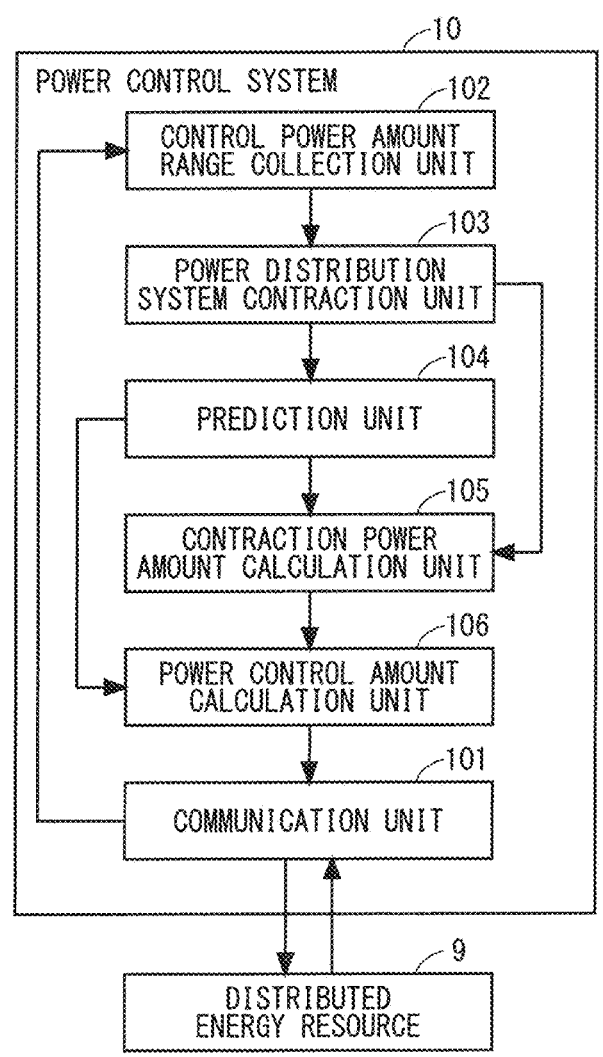
FIG. 2 A block diagram illustrating an example of a configuration of a power control system according to the embodiment 1.

FIG. 2 is a block diagram illustrating an example of a configuration of the power control system 10 according to the embodiment 1. The power control system 10 includes a communication unit 101, a control power amount range collection unit 102, a power distribution system contraction unit 103, a prediction unit 104, a contraction power amount calculation unit 105, and a power control amount calculation unit 106.

The communication unit 101 performs communication with a communication unit 911 in the distributed energy resource 9. The communication unit 101 receives the control power amount range transmitted from the distributed energy resource 9, and transmits the power control amount calculated by the power control amount calculation unit 106 to the distributed energy resource 9.

The control power amount range collection unit 102 collects the control power amount range of the distributed energy resource 9 connected to the power distribution system 5 via the communication unit 101.

The power distribution system contraction unit 103 contracts the power distribution system 5 including the distributed energy resource 9 in a point of the power transmission system 2 to make it serve as a contraction power distribution system using the control power amount range collected by the control power amount range collection unit 102. The power distribution system contraction unit 103 contracts the power distribution system 5 in the point of the power transmission system 2 to satisfy an operational limitation (upper-lower limit values of voltage in the power distribution system 5 and the control power amount range collected by the control power amount range collection unit 102) of the power distribution system 5. This corresponds to contraction of the distributed energy resource 9 interconnected to the power distribution system 5 in a primary side of the substation LRT 4. Then, the power distribution system contraction unit 103 calculates a contraction control power amount range S2 which is the control range of the active power amount and the reactive power amount of the contraction power distribution system. The contraction indicates that the power distribution system 5 is converted into one resource of the active power and the reactive power, and may include calculation of the contraction control power amount range. Herein, the contraction does not include the calculation of the contraction control power amount range.

Figure 3:
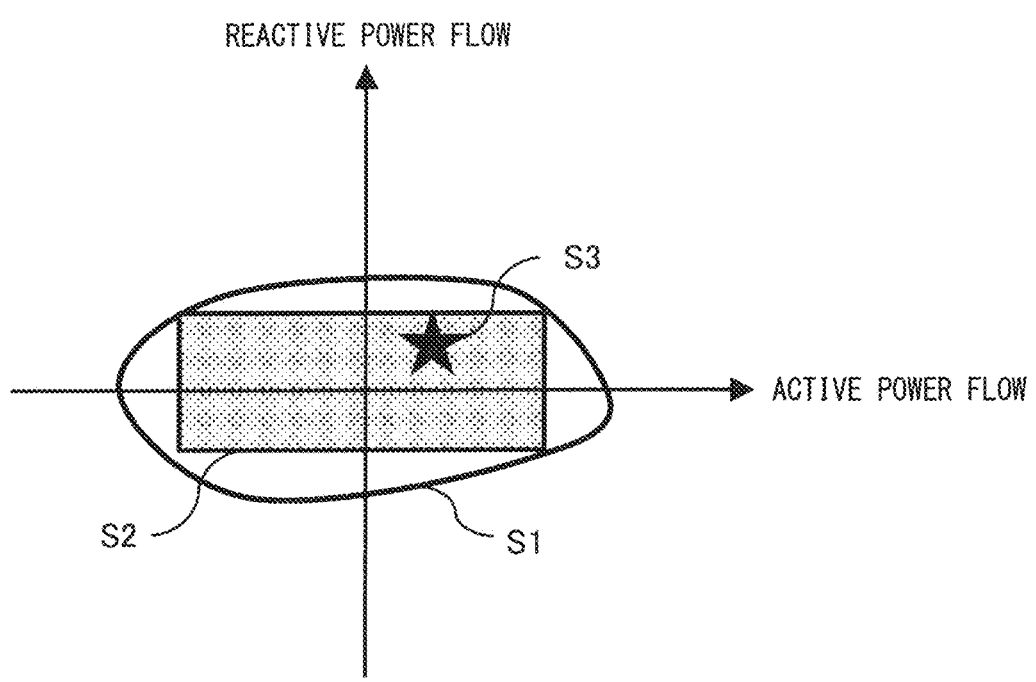
FIG. 3 A schematic view illustrating an example of a method of calculating a contraction control power amount range according to embodiments 1 to 3.

FIG. 3 is a schematic view illustrating an example of a method of calculating the contraction control power amount range S2 according to embodiment 1. A lateral axis indicates an active power flow on the primary side of the substation LRT 4, and a vertical axis indicates a reactive power flow on the primary side of the substation LRT 4. The power distribution system contraction unit 103 sets one of the active power flow and the reactive power flow to a fixed value, and sets the other one thereof to a target function. For example, the power distribution system contraction unit 103 sets the reactive power flow to the fixed value, and sets the active power flow to the target function. Then, a solution in which the target function is maximized is calculated based on the control power amount of the distributed energy resource 9 as a variable and the operational limitation of the power distribution system 5 as a limitation condition. Subsequently, a solution in which the target function is minimized is calculated. A maximum value and a minimum value of the target function serves as a range of the active power flow in a predetermined reactive power flow. A range S1 of the active power flow and the reactive power flow is calculated by performing these processes while changing the reactive power flow. The range S1 is approximated to a rectangular shape to be the contraction control power amount range S2 so that an optimized calculation subsequently performed by the power distribution system contraction unit 103 is simplified. Alternatively, approximation is not limited to rectangular approximation, but polygonal approximation, circular approximation, or oval approximation is also applicable. The variable and the limitation condition at a time of maximizing or minimizing the target function are not limited thereto described above. As one example, the variable may be the active power and the reactive power of the contraction power distribution system, and the limitation condition may be upper-lower limit values of current in the power distribution system 5.

Furthermore, the power distribution system contraction unit 103 may calculate the active power flow and the reactive power flow having a best power distribution system evaluation value as a contraction power amount candidate S3 based on the power distribution system evaluation value which is an evaluation value of the power distribution system 5 as the target function, the power control amount of the distributed energy resource 9 as the variable, and the operational limitation of the power distribution system as the limitation condition. The contraction power amount candidate S3 is included in the contraction control power amount range S2. Herein, the power distribution system evaluation value may be at least one of a voltage deviation amount, a current deviation amount, a reactive power flow on a primary side of the substation LRT 4, a power distribution loss, a voltage drop amount, a voltage rise amount, a voltage likelihood, a current likelihood, a reactive power control margin amount, a control margin amount of a tap of the substation LRT 4, a control margin amount of a tap of a step voltage regulator (SVR) provided in a midway portion of the distribution line 6, a power factor, an unbalance factor, a voltage limitation violation penalty, and/or a current limitation violation penalty or a weight sum thereof. The variable at the time of setting a best power distribution system evaluation value may be an LRT tap position or an SVR tap position in addition to the power control amount of the distributed energy resource 9.

Returning to FIG. 2, the prediction unit 104 predicts a demand of load not shown but connected to the power transmission system 2 and sets the demand to a power transmission prediction load. The prediction unit 104 predicts the demand of the load 8 connected to the power distribution system 5 and a power generation amount of the distributed energy resource 9, and sets them to a power distribution prediction load and a power distribution prediction power generation amount, respectively. The power transmission prediction load may be a unit of each load, or may also be a total amount of the plurality of loads. The power distribution prediction load and the power distribution prediction power generation amount may be a unit of each load 8 and a unit of each distributed energy resource 9, or may also be a total sum of the plurality of loads 8 and the plurality of distributed energy resources 9. Any method is applicable to a prediction method used by the prediction unit 104, thus a statistic method using a demand profile and a power generation profile stored in a storage unit not shown in the drawings is also applicable, for example. Also applicable is a method predicted based on data regarding a weather prediction and a meteorological prediction, for example, received from a system not shown in the drawings outside the power control system 10.

The contraction power amount calculation unit 105 calculates a contraction power amount made up of the active power amount and the reactive power amount of the contraction power distribution system to satisfy the contraction control power amount range calculated by the power distribution system contraction unit 103 based on at least a power transmission system evaluation value indicating evaluation of a state of the power transmission system 2. Alternatively, the contraction power amount calculation unit 105 calculates the contraction power amount to satisfy the contraction control power amount range based on the power transmission prediction load from the prediction unit 104 and the power transmission system evaluation value. Specifically, the contraction power amount calculation unit 105 calculates the contraction power amount having a best power transmission system evaluation value based on the power transmission system evaluation value as the target function, the contraction power amount as the variable, and the operational limitation of the power transmission system 2 (the upper-lower limit values of voltage in the power transmission system 2 and the contraction control power amount range S2 calculated by the power distribution system contraction unit 103, for example) as the limitation condition. Herein, the power transmission system evaluation value may be at least one of a voltage deviation amount, a current deviation amount, a power transmission loss, a steady-state stability, a voltage likelihood, a current likelihood, a reactive power control margin amount, a control margin amount of a tap of transformer, a voltage limitation violation penalty, and/or a current limitation violation penalty or a weight sum thereof. When the power distribution system contraction unit 103 calculates the contraction power amount candidate S3, the power transmission system evaluation value may include the contraction power amount candidate S3. Accordingly, the contraction power amount can be calculated while maintaining the state of the power distribution system 5. The variable at the time of setting a best power transmission system evaluation value may be an input amount of the reactive power of a voltage reactive power control system (VQC) apparatus, a transformer tap position, an active power output of a power generator, a reactive power output of a power generator, and a terminal voltage of a power generator in addition to the contraction power amount.

The power control amount calculation unit 106 calculates the power control amount of the distributed energy resource 9 based on at least the contraction power amount calculated by the contraction power amount calculation unit 105 and the power distribution system evaluation value. Alternatively, the power control amount calculation unit 106 calculates the power control amount based on the power distribution prediction load and the power distribution prediction power generation amount from the prediction unit 104, the contraction power amount, and the power distribution system evaluation value. Specifically, the power control amount calculation unit 106 calculates the power control amount so that a difference between the active power in the contraction power amount and the active power flow of the power distribution system 5 is equal to or smaller than a first predetermined amount, and a difference between the reactive power in the contraction power amount and the reactive power flow of the power distribution system 5 is equal to or smaller than a second predetermined amount. At this time, the power control amount calculation unit performs the method similar to the calculation of the contraction power amount candidate S3 performed by the power distribution system contraction unit 103, that is to say, calculation of the power control amount having the best power distribution system evaluation value. Herein, each of the first predetermined amount and the second predetermined amount is an amount by which the power transmission system evaluation value is not deteriorated. Accordingly, the power control amount can be calculated while maintaining the state of the power transmission system 2. The power control amount calculation unit 106 transmits the power control amount to the distributed energy resource 9 via the communication unit 101.

FIG. 4 is a block diagram illustrating an example of a configuration of the distributed energy resource 9 according to the embodiment 1. As illustrated in FIG. 4, the distributed energy resource 9 includes a power control apparatus 91 and a distributed energy apparatus 92. Furthermore, the power control apparatus 91 includes the communication unit 911, the power control unit 912, a control power amount range calculation unit 913, and a storage unit 914.

The communication unit 911 transmits the control power amount range to the power control system 10 in a constant cycle for a constant period, and receives the power control amount from the power control system 10 in a constant cycle for a constant period. Herein, a combination of the constant cycle and constant period may be an optical combination, thus the transmission and reception may be performed every thirty minutes for twenty-four hours or every five minutes for one hour. The constant period is not necessary.

The power control unit 912 controls the distributed energy apparatus 92 so that the power control amount received by the communication unit 911 is outputted at a designated time. Alternatively, the power control unit 912 refers to a power control schedule which the storage unit 914 receives from the power control system 10 via the communication unit 911 and stores to control the distributed energy apparatus 92 in accordance with the schedule. The power control unit 912 may store the power control amount in the storage unit 914.

The control power amount range calculation unit 913 calculates the control power amount range, and transmits the control power amount range to the power control system 10 via the communication unit 911. It is also applicable that the control power amount range calculation unit 913 calculates the control power amount range upon receiving a transmission request from the power control system 10 and transmits the control power amount range to the power control system 10. Alternatively, the control power amount range calculation unit 913 may transmit the control power amount range previously stored in the storage unit 914 for a constant period to the power control system 10 at an optional timing.

The distributed energy apparatus 92 is an energy apparatus such as a secondary cell, a solar power generation, and an electric automobile, for example, but is not limited thereto. The energy apparatus is an apparatus interconnected to a power distribution system via a power conditioner or an inverter. It is also applicable that the power control apparatus 91 is built in a power conditioner or an inverter, or built in an energy management system such as a home energy management system (HEMS), a building energy management system (BEMS), and a factory energy management system (FEMS). It is also applicable that some function of the power control apparatus 91 is built in a power conditioner or an inverter, and a remaining function is built in an energy management system.

Figure 5:
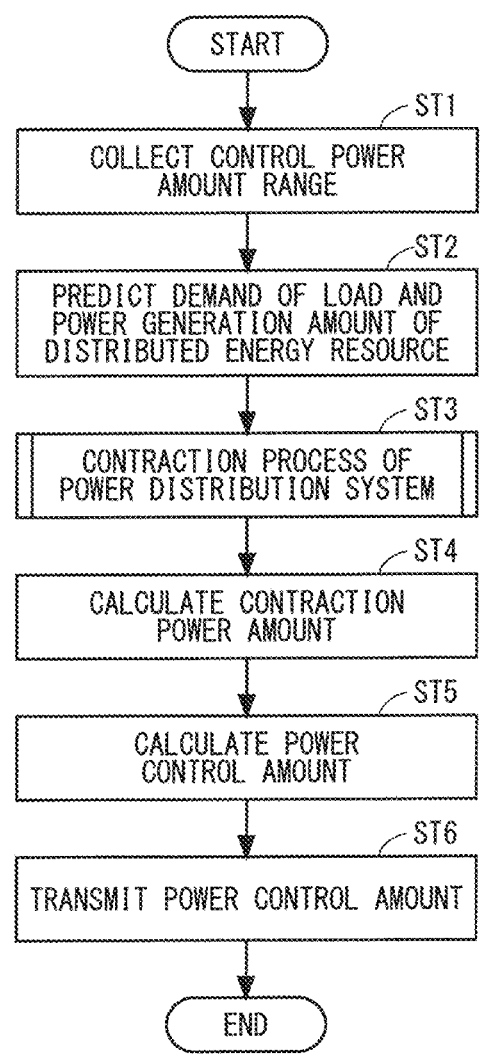
FIG. 5 A flow chart illustrating an example of an operation of a power control system according to the embodiment 1.

FIG. 5 is a flow chart illustrating an example of an operation of the power control system 10 according to the embodiment 1. That is to say, FIG. 5 is a flow chart illustrating an example of a power control method according to the embodiment 1.

As illustrated in FIG. 5, when the operation of the power control system 10 is started by a means not shown in the drawings, the control power amount range collection unit 102 collects the control power amount range of the distributed energy resource 9 (Step ST1).

The prediction unit 104 predicts the demand of the load connected to the power transmission system 2 and sets the demand to the power transmission prediction load. The prediction unit 104 predicts the demand of the load 8 connected to the power distribution system 5 and the power generation amount of the distributed energy resource 9, and sets them to the power distribution prediction load and the power distribution prediction power generation amount, respectively (Step ST2).

The power distribution system contraction unit 103 contracts the power distribution system 5 including the distributed energy resource 9 in the point of the power transmission system 2 to make it serve as the contraction power distribution system using the control power amount range collected by the control power amount range collection unit 102 (Step ST3). The process in Step ST3 is described in detail hereinafter using FIG. 6.

The contraction power amount calculation unit 105 calculates a contraction power amount of the contraction power distribution system to satisfy the contraction control power amount range calculated by the power distribution system contraction unit 103 based on at least the power transmission system evaluation value. Alternatively, the contraction power amount calculation unit 105 calculates the contraction power amount to satisfy the contraction control power amount range based on the power transmission prediction load predicted by the prediction unit 104 and the power transmission system evaluation value (Step ST4).

The power control amount calculation unit 106 calculates the power control amount of the distributed energy resource 9 based on at least the contraction power amount calculated by the contraction power amount calculation unit 105 and the power distribution system evaluation value. Alternatively, the power control amount calculation unit 106 calculates the power control amount based on the power distribution prediction load and the power distribution prediction power generation amount predicted by the prediction unit 104, the contraction power amount, and the power distribution system evaluation value (Step ST5).

The communication unit 101 transmits the power control amount calculated by the power control amount calculation unit 106 to the distributed energy resource 9 (Step ST6).

The operation of the power control system 10 is finished by the means not shown in the drawings. The process in FIG. 5 is repetitively executed in a constant cycle. Herein, the constant cycle may have an optical value, thus thirty minutes or five minutes are applicable, for example. The process in FIG. 5 may not be executed in a constant cycle.

Figure 6:
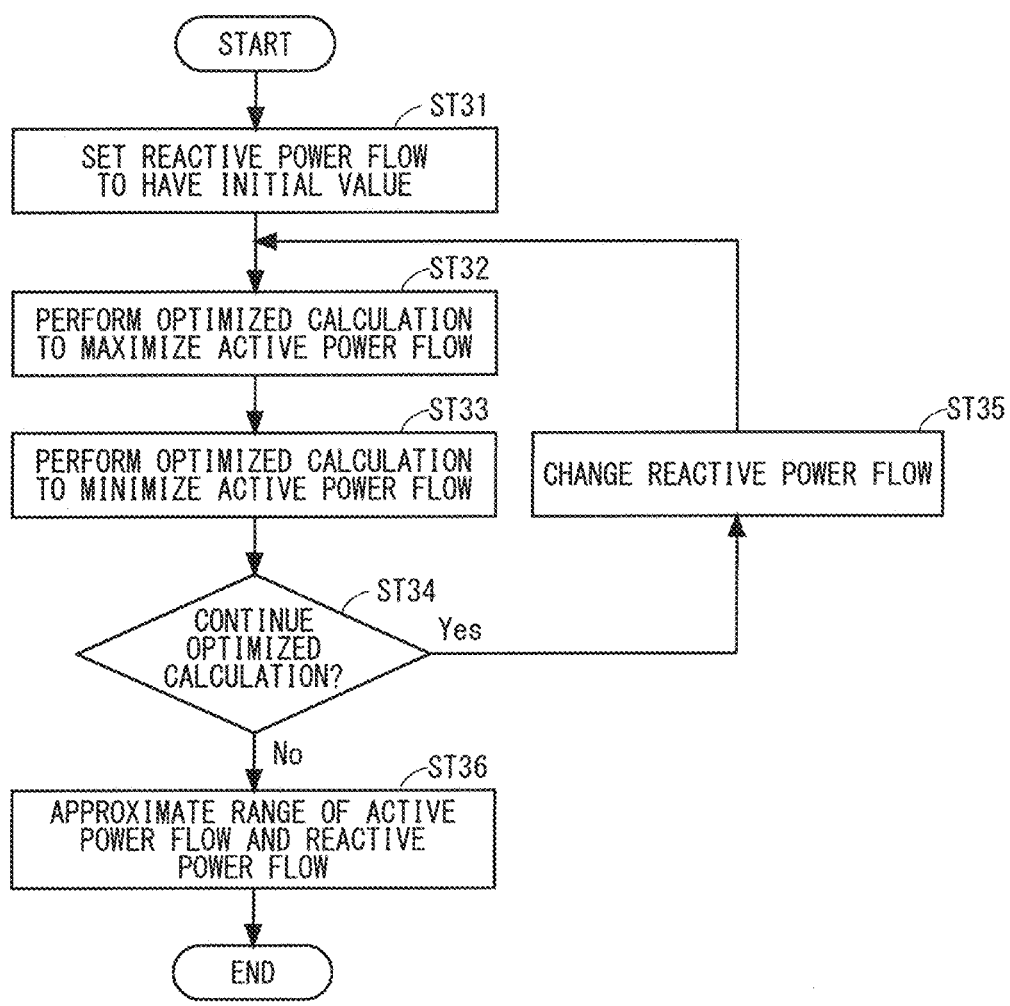
FIG. 6 A flow chart illustrating an example of an operation of a power distribution system contraction unit according to the embodiments 1 to 3.

FIG. 6 is a flow chart illustrating an example of an operation of the power distribution system contraction unit 103 according to the embodiment 1. That is to say, FIG. 6 is a flow chart illustrating details of the process in Step ST3 in FIG. 5, and is a flow chart illustrating an example of a method of calculating the contraction control power amount range in FIG. 3.

As illustrated in FIG. 6, when a contraction process of contracting the power distribution system is started by the power distribution system contraction unit 103, the power distribution system contraction unit 103 sets the reactive power flow to have an initial value (Step ST31). That is to say, the contraction power amount calculation unit 105 fixes the value of the reactive power flow as the initial value.

The power distribution system contraction unit 103 sets the active power flow as the target function, the control power amount of the distributed energy resource 9 as the variable, and the operational limitation of the power distribution system 5 as the limitation condition. Then, the power distribution system contraction unit 103 performs an optimized calculation of maximizing the target function (Step ST32).

The power distribution system contraction unit 103 performs an optimized calculation of minimizing the target function (Step ST33).

The power distribution system contraction unit 103 determines whether or not to continue the optimized calculation (Step ST34). The determination in Step ST34 may be a determination whether or not the reactive power flow can be sufficiently changed, for example. Alternatively, the determination thereof may be a determination whether or not there is a solution in the optimized calculation in Step ST32 and Step ST33. In the former case, when the reactive power flow is sufficiently changed, the power distribution system contraction unit 103 determines that the optimized calculation needs not be performed any more, and sets the determination in Step ST34 to "No". Otherwise, the power distribution system contraction unit 103 sets the determination in Step ST34 to "Yes". In the latter case, when there is no solution in the optimized calculation, the power distribution system contraction unit 103 determines that the solution cannot be obtained even if the optimized calculation is performed any more, and sets the determination in Step ST34 to "No". Otherwise, the power distribution system contraction unit 103 sets the determination in Step ST34 to "Yes".

When the determination in Step ST34 is "Yes", the process proceeds to Step ST35. When the determination in Step ST34 is "No", the process proceeds to Step ST36.

When the determination in Step ST34 is "Yes", the power distribution system contraction unit 103 changes the reactive power flow (Step ST35). That is to say, the power distribution system contraction unit 103 performs the optimized calculation with a reactive power flow different from the reactive power flow set in Step ST31 or a reactive power flow different from the reactive power flow previously set in Step ST35. After the process in Step ST35 is performed, the process returns to Step ST32, and the optimized calculation is performed.

When the determination in Step ST34 is "No", the power distribution system contraction unit 103 approximates the range S1 of the active power flow and the reactive power flow obtained by the optimized calculation in Step ST32 and Step ST33 (Step ST36). As an example, the range S1 is approximated to a rectangular shape, and the range obtained by approximation is set to the contraction control power amount range S2. Then, the power distribution system contraction unit 103 finishes the contraction process of the power distribution system.

According to the embodiment 1 described above, the power distribution system 5 is contracted in the point of the power transmission system 2 to serve as the contraction power distribution system, and the power control amount is calculated in consideration of the contraction power distribution system and the power transmission system 2, thus the calculation load can be reduced while favorably maintaining the power distribution system evaluation value and the power transmission system evaluation value.

Embodiment 2

Figure 7:
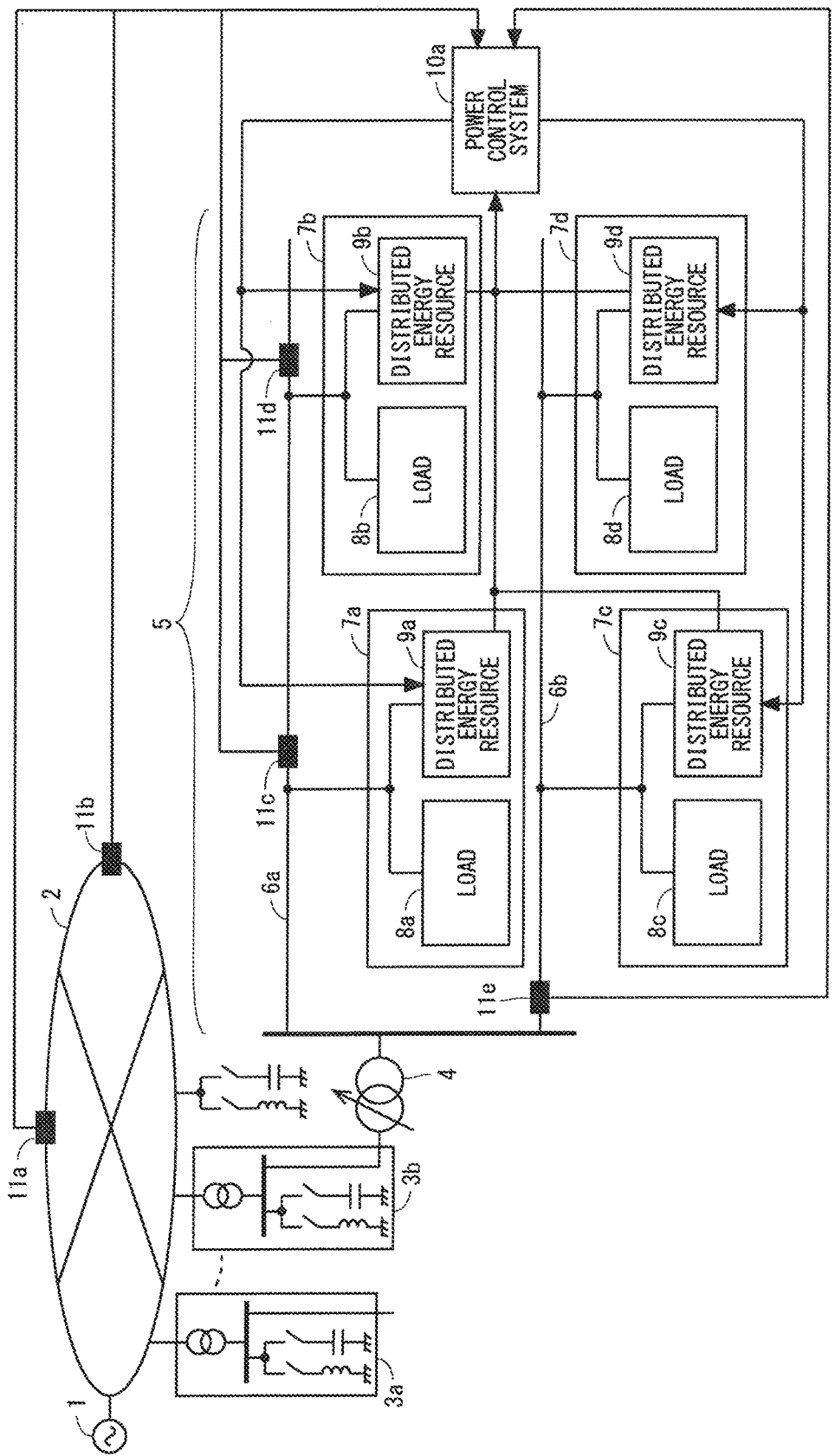
FIG. 7 A drawing illustrating an example of a configuration of a whole power transmission-distribution system according to the embodiment 2.

FIG. 7 is a drawing illustrating an example of a configuration of a whole power transmission-distribution system according to an embodiment 2. As illustrated in FIG. 7, the power transmission-distribution system is made up of the large-scale power generation facility 1, the power transmission system 2, the voltage reactive power control devices 3a and 3b, the substation LRT 4, the power distribution system 5, the power control system 10a, and measurement devices 11a, 11b, 11c, 11d, and 11e. FIG. 7 is different from FIG. 1 in that the power transmission-distribution system includes the power control system 10a in place of the power control system 10, and includes the measurement devices 11a, 11b, 11c, 11d, and 11e. The constituent elements other than the power control system 10a and the measurement devices 11a, 11b, 11c, 11d, and 11e are the same as those illustrated in FIG. 1, thus the description is omitted.

The measurement devices 11a and 11b are disposed in the power transmission system 2 to measure a state amount of the power transmission system 2. The measurement devices 11c, 11d, and 11e are disposed in the power distribution system 5 to measure a state amount of the power distribution system 5. Herein, the state amount is line voltage, phase voltage, line current, a power factor, an active power flow, and a reactive power flow, for example. That is to say, the state amount includes voltage, current, an active power flow, and a reactive power flow of the power transmission system 2 and the power distribution system 5. In FIG. 7, the measurement devices 11a and 11b are disposed in the power transmission system 2, and the measurement devices 11c, 11d, and 11e are disposed in the power distribution system 5, however, the number of the disposed measurement devices is not limited thereto. When the measurement devices 11a, 11b, 11c, 11d, and 11e are indicated without distinction, they are referred to as the measurement device 11 hereinafter.

The power control system 10a collects a control power amount range which is a control range of an active power amount and a reactive power amount of the distributed energy resource 9 from the distributed energy resource 9. The power control system 10a collects the state amount of the power transmission system 2 and the power distribution system 5 from the measurement device 11. The power control system 10a calculates the power control amount made up of the active power amount and the reactive power amount controlled by the distributed energy resource 9 using the control power amount range and the state amount, and transmits the power control amount to the distributed energy resource 9. The power control system 10a and the measurement device 11 are connected to each other via communication network. The communication network may be Internet, dedicated network, or network using both of them.

Figure 8:
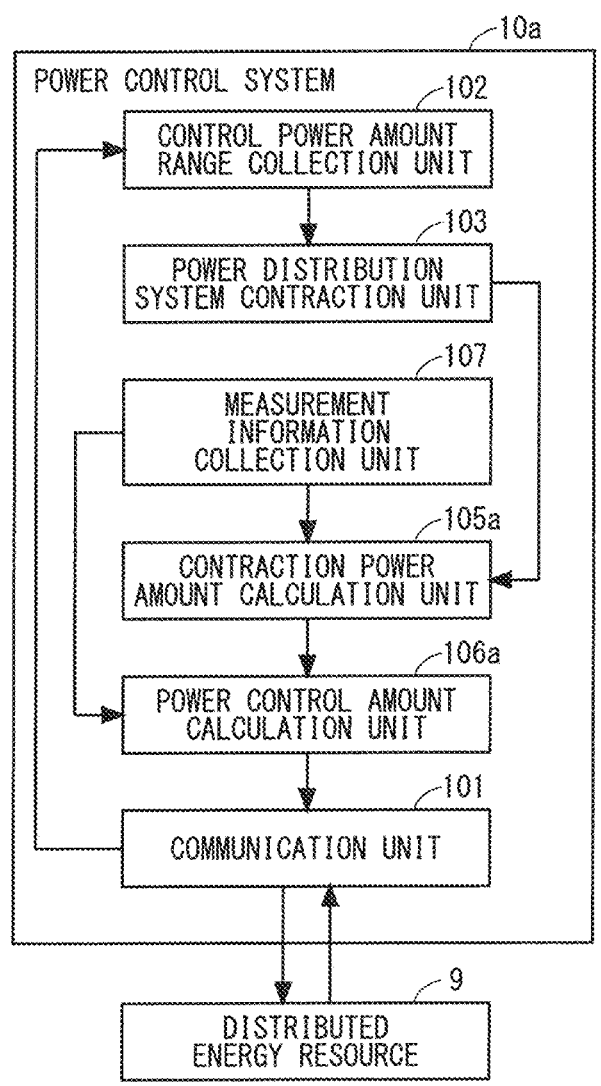
FIG. 8 A block diagram illustrating an example of a configuration of a power control system according to the embodiment 2.

FIG. 8 is a block diagram illustrating an example of a configuration of the power control system 10a according to the embodiment 2. The power control system 10a includes the communication unit 101, the control power amount range collection unit 102, the power distribution system contraction unit 103, a contraction power amount calculation unit 105a, a power control amount calculation unit 106a, and a measurement information collection unit 107. FIG. 8 is different from FIG. 2 in that the power control system 10a includes the measurement information collection unit 107 in place of the prediction unit 104, includes the contraction power amount calculation unit 105a in place of the contraction power amount calculation unit 105, and includes the power control amount calculation unit 106a in place of the power control amount calculation unit 106. The constituent elements other than the measurement information collection unit 107, the contraction power amount calculation unit 105a, and the power control amount calculation unit 106a are the same as those illustrated in FIG. 2, thus the description is omitted.

The measurement information collection unit 107 collects power transmission measurement information including the state amount of the power transmission system 2, that is to say, the voltage, the current, the active power flow, and the reactive power flow in the power transmission system 2. The measurement information collection unit 107 collects power distribution measurement information including the state amount of the power distribution system 5, that is to say, the voltage, the current, the active power flow, and the reactive power flow in the power distribution system 5. The measurement information collection unit 107 outputs the power transmission measurement information to the contraction power amount calculation unit 105a, and outputs the power distribution measurement information to the power control amount calculation unit 106a.

The contraction power amount calculation unit 105a calculates the power transmission system evaluation value indicating evaluation of the state of the power transmission system 2 using the power transmission measurement information from the measurement information collection unit 107, and calculates the contraction power amount made up of the active power amount and the reactive power amount of the contraction power distribution system based on the power transmission system evaluation value. Specifically, the contraction power amount calculation unit 105a calculates the power transmission system evaluation value using the power transmission measurement information of the power transmission system 2, and calculates the contraction power amount having the best power transmission system evaluation value.

The power control amount calculation unit 106a calculates the power distribution system evaluation value indicating the evaluation of the state of the power distribution system 5 using the power distribution measurement information from the measurement information collection unit 107, and calculates the power control amount based on the power distribution system evaluation value. Specifically, the power control amount calculation unit 106a calculates the power distribution system evaluation value using the power distribution measurement information of the power distribution system 5, and calculates the power control amount having the best power distribution system evaluation value. The power control amount calculation unit 106a transmits the power control amount to the distributed energy resource 9 via the communication unit 101.

Figure 9:
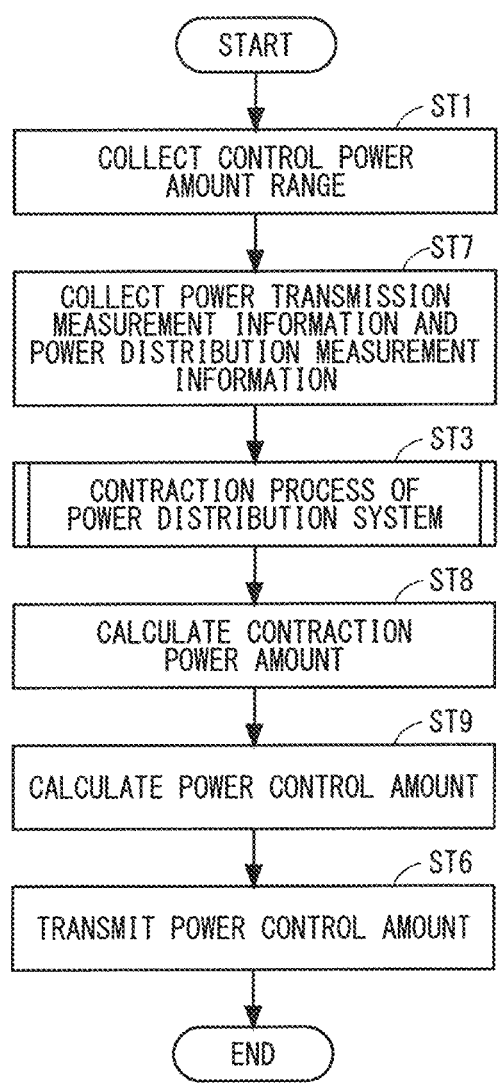
FIG. 9 A flow chart illustrating an example of an operation of a power control system according to the embodiment 2.

FIG. 9 is a flow chart illustrating an example of an operation of the power control system 10a according to the embodiment 2. That is to say, FIG. 9 is a flow chart illustrating an example of a power control method according to the embodiment 2. Step ST1, Step ST3, and Step ST6 in FIG. 9 are the same as Step ST1, Step ST3, and Step ST6 in FIG. 5, thus the description is omitted.

The measurement information collection unit 107 collects power transmission measurement information including the state amount of the power transmission system 2, that is to say, the voltage, the current, the active power flow, and the reactive power flow in the power transmission system 2. The measurement information collection unit 107 collects power distribution measurement information including the state amount of the power distribution system 5, that is to say, the voltage, the current, the active power flow, and the reactive power flow in the power distribution system 5 (Step ST7).

The contraction power amount calculation unit 105a calculates the power transmission system evaluation value using the power transmission measurement information collected by the measurement information collection unit 107, and calculates the contraction power amount of the contraction power distribution system to satisfy the contraction control power amount range calculated by the power distribution system contraction unit 103 based on the power transmission system evaluation value (Step ST8).

The power control amount calculation unit 106a calculates the power distribution system evaluation value using the power distribution measurement information collected by the measurement information collection unit 107, and calculates the power control amount based on the contraction power amount and the power distribution system evaluation value (Step ST9).

The process in FIG. 9 is repetitively executed in a constant cycle. Herein, the constant cycle may have an optical value, thus thirty minutes or five minutes are applicable, for example. The process in FIG. 9 may not be executed in a constant cycle.

According to the embodiment 2 described above, the measurement information collection unit 107 collects the measurement information of the power transmission system 2 and the power distribution system 5, thus the power transmission system evaluation value and the power distribution system evaluation value can be grasped in real time, and as a result, the distributed energy resource 9 can be controlled in real time.

Embodiment 3

Figure 10:
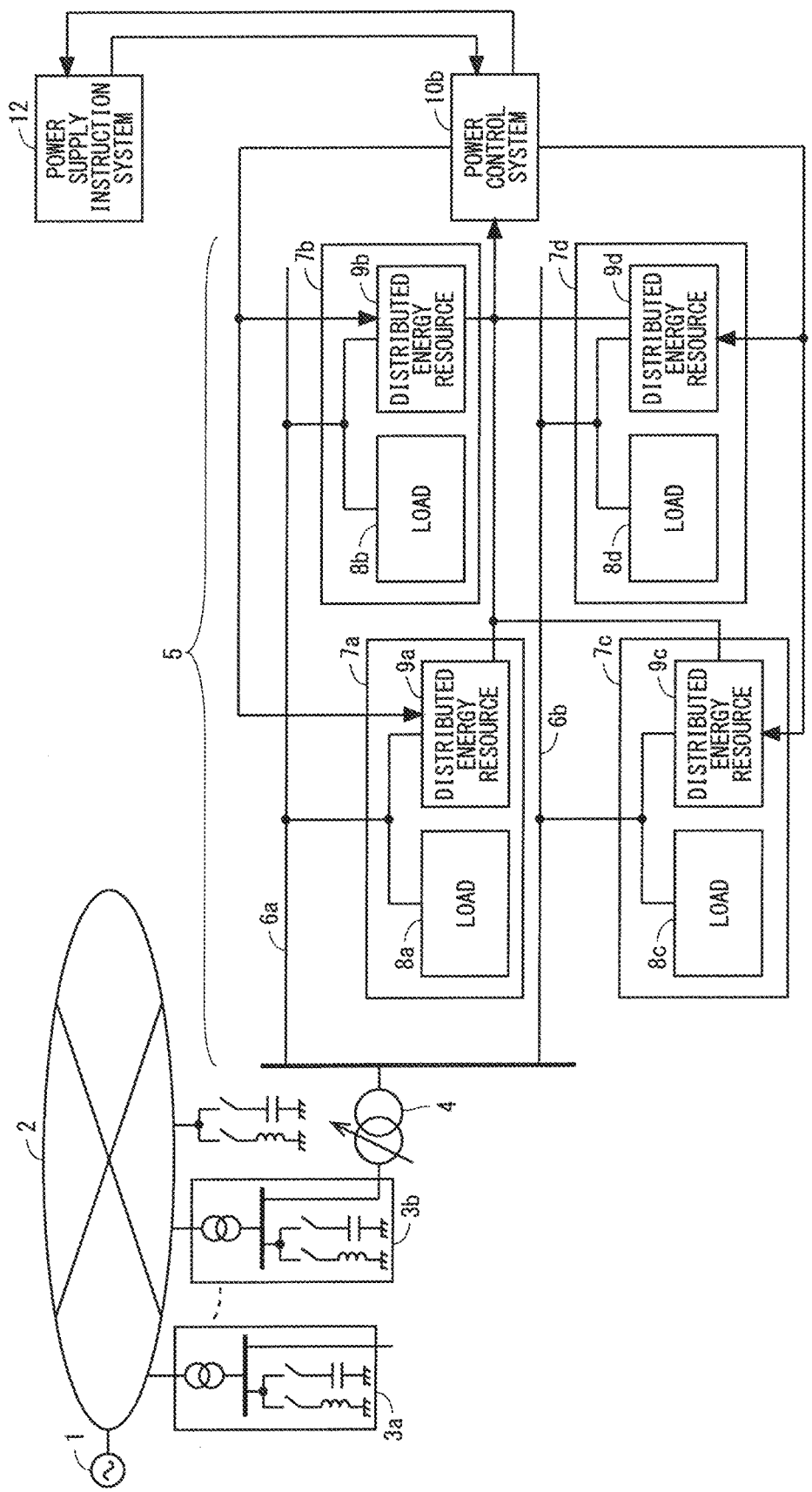
FIG. 10 A drawing illustrating an example of a configuration of a whole power transmission-distribution system according to the embodiment 3.

FIG. 10 is a drawing illustrating an example of a configuration of a whole power transmission-distribution system according to an embodiment 3. As illustrated in FIG. 10, the power transmission-distribution system is made up of the large-scale power generation facility 1, the power transmission system 2, the voltage reactive power control devices 3a and 3b, the substation LRT 4, the power distribution system 5, a power control system 10b, and a power supply instruction system 12. FIG. 10 is different from FIG. 1 in that the power transmission-distribution system includes the power control system 10b in place of the power control system 10, and includes the power supply instruction system 12. The constituent elements other than the power control system 10b and the power supply instruction system 12 are the same as those illustrated in FIG. 1, thus the description is omitted.

The power supply instruction system 12 generally determines the reactive power control amount of the large-scale power generation facility 1 and the voltage reactive power control devices 3a and 3b disposed in the power transmission system 2, and controls them. A configuration of the power supply instruction system 12 is not limited thereto, but may execute some of the processes of the power control systems 10 and 10a in the embodiments 1 and 2. Specifically, the power supply instruction system 12 performs the process of the contraction power amount calculation units 105 and 105a, that is to say, calculation of the contraction power amount based on the power transmission system evaluation value in place of the contraction power amount calculation units 105 and 105a. The power supply instruction system 12 may execute not only the process of the contraction power amount calculation units 105 and 105a but also the other process of the power control systems 10 and 10a. Herein, the power supply instruction system 12 performs the process of the contraction power amount calculation units 105 and 105a in the embodiments 1 and 2. The power supply instruction system 12 is held by a power transmission-distribution company.

The power control system 10b collects a control power amount range which is a control range of an active power amount and a reactive power amount of the distributed energy resource 9 from the distributed energy resource 9. The power control system 10b transmits the contraction control power amount range which is the control range of the active power amount and the reactive power amount of the contraction power distribution system calculated using the control power amount range to the power supply instruction system 12. The power control system 10b receives the contraction power amount of the contraction power distribution system calculated by the power supply instruction system 12 using the contraction control power amount range. The power control system 10b calculates the power control amount made up of the active power amount and the reactive power amount controlled by the distributed energy resource 9 using the contraction power amount, and transmits the power control amount to the distributed energy resource 9.

The power control system 10b and the power supply instruction system 12 are connected to each other via communication network. The communication network may be Internet, dedicated network, or network using both of them.

FIG. 11 is a block diagram illustrating an example of a configuration of the power control system 10b and the power supply instruction system 12 according to the embodiment 3. The power control system 10b includes a communication unit 101b, the control power amount range collection unit 102, a power distribution system contraction unit 103b, a prediction unit 104b, and a power control amount calculation unit 106b. The power supply instruction system 12 includes a communication unit 121, a power distribution system contraction collection unit 122, and a contraction power amount calculation unit 123. The power control system 10b in FIG. 11 is different from the power control system 10 FIG. 2 in that the power control system 10b includes the communication unit 101b in place of the communication unit 101, the power distribution system contraction unit 103b in place of the power distribution system contraction unit 103, the prediction unit 104b in place of the prediction unit 104, and the power control amount calculation unit 106b in place of the power control amount calculation unit 106. The power control system 10b in FIG. 11 is different from the power control system 10 in FIG. 2 in that the power control system 10b does not include the contraction power amount calculation unit 105. The constituent element other than the communication unit 101b, the power distribution system contraction unit 103b, the prediction unit 104b, and the power control amount calculation unit 106b are the same as those illustrated in FIG. 2, thus the description is omitted.

The communication unit 101b performs communication with the communication unit 911 in the distributed energy resource 9 and the communication unit 121 in the power supply instruction system 12. Specifically, the communication unit 101b receives the control power amount range transmitted from the distributed energy resource 9, and transmits the power control amount calculated by the power control amount calculation unit 106b to the distributed energy resource 9. The communication unit 101b transmits the contraction control power amount range calculated by the power distribution system contraction unit 103b to the power supply instruction system 12, and receives the contraction power amount transmitted from the power supply instruction system 12.

The power distribution system contraction unit 103b contracts the power distribution system 5 including the distributed energy resource 9 in a point of the power transmission system 2 to make it serve as a contraction power distribution system using the control power amount range collected by the control power amount range collection unit 102. Then, the power distribution system contraction unit 103b calculates the contraction control power amount range S2 which is the control range of the active power amount and the reactive power amount of the contraction power distribution system. The power distribution system contraction unit 103b transmits the contraction control power amount range S2 to the power distribution system contraction collection unit 122 in the power supply instruction system 12 via the communication unit 101b.

The prediction unit 104b predicts a demand of the load connected to the power transmission system 2 and sets the demand to the power transmission prediction load. The prediction unit 104b predicts a demand of the load 8 connected to the power distribution system 5 and a power generation amount of the distributed energy resource 9, and sets them to a power distribution prediction load and a power distribution prediction power generation amount, respectively. The prediction unit 104b transmits the power transmission prediction load to the contraction power amount calculation unit 123 in the power supply instruction system 12 via the communication unit 101b. The prediction unit 104b outputs the power distribution prediction load and the power distribution prediction power generation amount to the power control amount calculation unit 106b.

The power control amount calculation unit 106b calculates the power control amount made up of the active power amount and the reactive power amount controlled by the distributed energy resource 9 based on the contraction power amount calculated based on at least the contraction control power amount range and the power transmission system evaluation value indicating the evaluation of the state of the power transmission system 2 and made up of the active power amount and the reactive power amount of the contraction power distribution system and the power distribution system evaluation value indicating the evaluation of the state of the power distribution system 5. That is to say, the power control amount calculation unit 106b calculates the power control amount based on at least the contraction power amount calculated by the contraction power amount calculation unit 123 in the power supply instruction system 12 and the power distribution system evaluation value. Alternatively, the power control amount calculation unit 106b calculates the power control amount based on the power distribution prediction load and the power distribution prediction power generation amount from the prediction unit 104b, the contraction power amount, and the power distribution system evaluation value. The power control amount calculation unit 106b transmits the power control amount to the distributed energy resource 9 via the communication unit 101b.

The communication unit 121 performs communication with the communication unit 101b in the power control system 10b. Specifically, the communication unit 121 receives the contraction control power amount range calculated by the power distribution system contraction unit 103b, and transmits the contraction power amount calculated by the contraction power amount calculation unit 123.

The power distribution system contraction collection unit 122 collects the contraction control power amount range from the power distribution system contraction unit 103b in the power control system 10b via the communication unit 121.

The contraction power amount calculation unit 123 calculates the contraction power amount of the contraction power distribution system to satisfy the contraction control power amount range calculated by the power distribution system contraction unit 103b based on at least the power transmission system evaluation value. Alternatively, the contraction power amount calculation unit 105 calculates the contraction power amount to satisfy the contraction control power amount range based on the power transmission prediction load from the prediction unit 104 and the power transmission system evaluation value. The contraction power amount calculation unit 123 transmits the contraction power amount to the power control amount calculation unit 106b in the power control system 10b via the communication unit 121.

In FIG. 11, the measurement information collection unit 107 in the embodiment 2 may be included in place of the prediction unit 104b. In this case, as illustrated in FIG. 10, the power transmission-distribution system is made up of the large-scale power generation facility 1, the power transmission system 2, the voltage reactive power control devices 3a and 3b, the substation LRT 4, the power distribution system, the power control system 10b, the power supply instruction system 12, and the measurement device 11.

Figure 12:
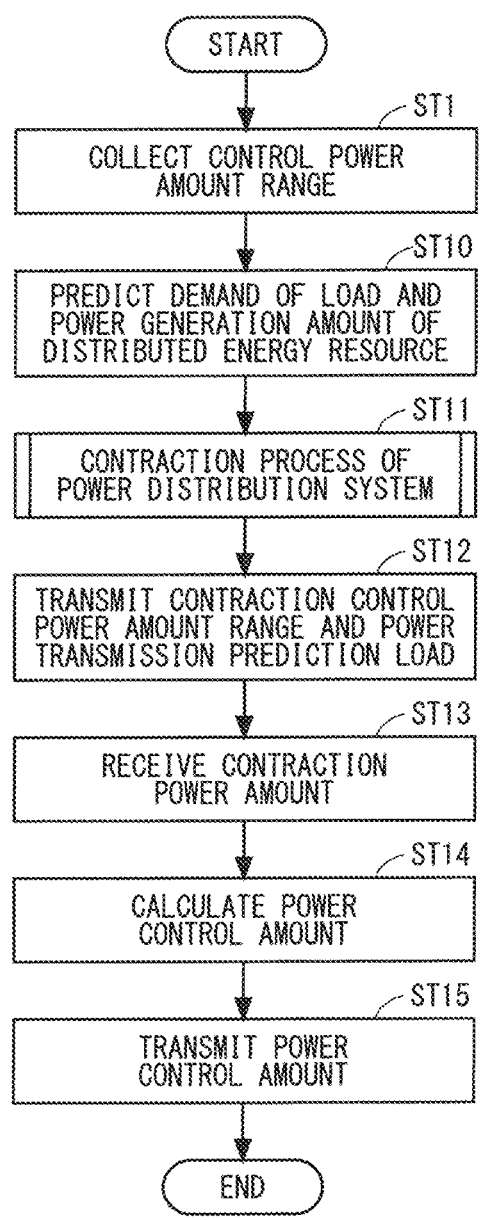
FIG. 12 A flow chart illustrating an example of an operation of the power control system according to the embodiment 3.

FIG. 12 is a flow chart illustrating an example of an operation of the power control system 10b according to the embodiment 3. That is to say, FIG. 12 is a flow chart illustrating an example of a power control method according to the embodiment 3. Step ST1 in FIG. 12 is the same as Step ST1 in FIG. 5, thus the description is omitted.

The prediction unit 104b predicts a demand of the load connected to the power transmission system 2 and sets the demand to the power transmission prediction load. The prediction unit 104b predicts the demand of the load 8 connected to the power distribution system 5 and the power generation amount of the distributed energy resource 9, and sets them to the power distribution prediction load and the power distribution prediction power generation amount, respectively (Step ST10).

The power distribution system contraction unit 103b contracts the power distribution system 5 including the distributed energy resource 9 in the point of the power transmission system 2 to make it serve as the contraction power distribution system using the control power amount range collected by the control power amount range collection unit 102 (Step ST11). Details of the process in Step ST11 is the same as that illustrated in FIG. 6.

The communication unit 101b transmits at least the contraction control power amount range calculated by the power distribution system contraction unit 103b to the power supply instruction system 12. Alternatively, the communication unit 101b transmits the contraction control power amount range and the power transmission prediction load predicted by the prediction unit 104b to the power supply instruction system 12 (Step ST12).

The communication unit 101b receives the contraction power amount from the power supply instruction system 12 (Step ST13).

The power control amount calculation unit 106b calculates the power control amount of the distributed energy resource 9 based on at least the contraction power amount received by the communication unit 101b and the power distribution system evaluation value. Alternatively, the power control amount calculation unit 106 calculates the power control amount based on the power distribution prediction load and the power distribution prediction power generation amount predicted by the prediction unit 104, the contraction power amount, and the power distribution system evaluation value (Step ST14).

The communication unit 101*b* transmits the power control amount calculated by the power control amount calculation unit 106*b* to the distributed energy resource 9 (Step ST15).

FIG. 13 is a flow chart illustrating an example of an operation of the power supply instruction system 12 according to the embodiment 3.

As illustrated in FIG. 13, when the operation of the power supply instruction system 12 is started by a means not shown in the drawings, the power distribution system contraction collection unit 122 collects the contraction control power amount range received by the communication unit 121 (Step ST16).

The contraction power amount calculation unit 123 calculates the contraction power amount of the contraction power distribution system to satisfy the contraction control power amount range received by the communication unit 121 based on at least the power transmission system evaluation value. Alternatively, the contraction power amount calculation unit 123 calculates the contraction power amount to satisfy the contraction control power amount range based on the power transmission prediction load received by the communication unit 121 and the power transmission system evaluation value (Step ST17).

The operation of the power supply instruction system 12 is finished by the means not shown in the drawings. The processes in Step ST16 and Step ST17 are performed in synchronization with the operation of the power control system 10*b* illustrated in FIG. 12.

According to the embodiment 3 described above, the power supply instruction system 12 calculates the contraction power amount of the contraction power distribution system, thus the calculation load of the power control system 10*b* can be reduced.

Described herein is a hardware configuration of the power control systems 10, 10*a*, and 10*b* and the power supply instruction system 12 according to the embodiments 1 to 3. Each function of the power control systems 10, 10*a*, and 10*b* and the power supply instruction system 12 can be achieved by a processing circuit. The processing circuit includes at least one processor and at least one memory.

FIGS. 14A and 14B are drawings illustrating a hardware configuration of the power control systems 10, 10*a*, and 10*b* and the power supply instruction system 12 according to the embodiments 1 to 3. The power control systems 10, 10*a*, and 10*b* and the power supply instruction system 12 can be achieved by a processor 13 and a memory 14 illustrated in FIG. 14A. The processor 13 is a CPU (also referred to as a central processing unit, a central processor, a processing device, an arithmetic device, a microprocessor, a microcomputer, a processor, a digital signal processor (DSP)) or a system large scale integration (LSI).

The memory 14 is a non-volatile or volatile semiconductor memory such as a random access memory (RAM), a read only memory (ROM), a flash memory, an erasable programmable read only memory (EPROM), an electrically erasable programmable read-only memory (EEPROM, registered trademark), a hard disk drive (HDD), a magnetic disc, a flexible disc, an optical disc, a compact disc, a mini disc, or a digital versatile disk (DVD), for example.

The function of each unit of the power control systems 10, 10*a*, and 10*b* and the power supply instruction system 12 is achieved by software etc. (software, firmware, or software and firmware). The software etc. is described as a program, and is stored in the memory 14. The processor 13 reads out and executes a program stored in the memory 14, thereby achieving the function of each unit. That is to say, this program is deemed to make a computer execute a procedure or a method of the power control systems 10, 10*a*, and 10*b* and the power supply instruction system 12.

It is also applicable that a program executed by the processor 13 is a file in an installable form or executable form, and is stored in a storage medium readable by a computer to be provided as a computer program product. The program executed by the processor 13 may be provided to the power control systems 10, 10*a*, and 10*b* and the power supply instruction system 12 via network such as Internet, for example.

The power control systems 10, 10*a*, and 10*b* and the power supply instruction system 12 may be achieved by a dedicated processing circuit 15 illustrated in FIG. 14B. When the processing circuit 15 is the dedicated hardware, a single circuit, a complex circuit, a programmed processor, a parallel-programmed processor, an application specific integrated circuit (ASIC), a field-programmable gate array (FPGA), or a combination of them, for example, falls under the processing circuit 15.

Described above is the configuration that the function of each constituent element of the power control systems 10, 10*a*, and 10*b* and the power supply instruction system 12 is achieved by one of the software and the hardware, for example. However, the configuration is not limited thereto, but also applicable is a configuration of achieving constituent elements of a part of the power control systems 10, 10*a*, and 10*b* and the power supply instruction system 12 by software and achieving another part of them by dedicated hardware, for example. For example, the communication unit 101 in the power control system 10 is achieved by dedicated hardware, and another part thereof is achieved by software. The communication unit 101 in the power control system 10*a* is achieved by dedicated hardware, and another part thereof is achieved by software, for example. For example, the communication unit 101 in the power control system 10 is achieved by dedicated hardware, and another part thereof is achieved by software. The communication unit 121 in the power supply instruction system 12 is achieved by dedicated hardware, and another part thereof is achieved by software.

EXPLANATION OF REFERENCE SIGNS

1 large-scale power generation facility, 2 power transmission system, 3*a*, 3*b* voltage reactive power control device, 4 substation LRT, 5 power distribution system, 6, 6*a*, 6*b* distribution line, 7, 7*a*, 7*b*, 7*c*, 7*d* consumer facility, 8, 8*a*, 8*b*, 8*c*, 8*d* load, 9, 9*a*, 9*b*, 9*c*, 9*d* distributed energy resource, 91 power control apparatus, 911 communication unit, 912 power control unit, 913 control power amount range calculation unit, 914 storage unit, 92 distributed energy apparatus, 10, 10*a*, 10*b* power control system, 101, 101*b* communication unit, 102 control power amount range collection unit, 103, 103*b* power distribution system contraction unit, 104, 104*b* prediction unit, 105, 105*a*, contraction power amount calculation unit, 106, 106*a*, 106*b* power control amount calculation unit, 11, 11*a*, 11*b*, 11*c*, 11*d*, 11*e* measurement apparatus, 12 power supply instruction system, 121 communication unit, 122 power distribution system contraction collection unit, 123 contraction power amount calculation unit, 13 processor, 14 memory, 15 processing circuit, S1 range of electrical power flow, S2 contraction control power amount range, S3 contraction power amount candidate.

The invention claimed is:

1. A power control system, comprising: a processor to execute a program; and a memory to store the program which, when executed by the processor, performs processes of, collecting a control power amount range which is a control range of an active power amount and a reactive power amount of a distributed energy resource connected to a power distribution system;

contracting the power distribution system including the distributed energy resource in a power transmission system point to make the power distribution system serve as a contraction power distribution system using the control power amount range, and calculating a contraction control power amount range which is a control range of an active power amount and a reactive power amount of the contraction power distribution system;

calculating a contraction power amount made up of an active power amount and a reactive power amount of the contraction power distribution system to satisfy the contraction control power amount range based on a power transmission system evaluation value indicating evaluation of a state of a power transmission system; calculating a power control amount made up of an active power amount and a reactive power amount controlled by the distributed energy resource based on the contraction power amount and a power distribution system evaluation value indicating evaluation of a state of the power distribution system; and transmitting the power control amount to the distributed energy resource.

2. The power control system according to claim 1, further comprising predicting a demand of a load connected to the power transmission system and setting the demand to a power transmission prediction load, wherein the contraction power amount is calculated using the power transmission prediction load.

3. The power control system according to claim 1, further comprising predicting a demand of a load connected to the power distribution system and a power generation amount of the distributed energy resource, and setting the demand and the power generation amount to a power distribution prediction load and a power distribution prediction power generation amount, respectively, wherein the power control amount is calculated using the power distribution prediction load and the power distribution prediction power generation amount.

4. The power control system according to claim 1, further comprising collecting power transmission measurement information including voltage, current, an active power flow, and a reactive power flow in the power transmission system, wherein the power transmission system evaluation value is calculated using the power transmission measurement information, and the contraction power amount is calculated based on the power transmission system evaluation value.

5. The power control system according to claim 1, further comprising collecting power transmission measurement information including voltage, current, an active power flow, and a reactive power flow in each the power distribution system, wherein the power distribution system evaluation value is calculated using the power distribution measurement information, and the power control amount is calculated based on the power distribution system evaluation value.

6. The power control system according to claim 1, wherein a contraction power amount candidate in the contraction control power amount range is calculated based on the power distribution system evaluation value as a target function, and the contraction power amount is calculated based on the power transmission system evaluation value including the contraction power amount candidate.

7. The power control system according to claim 1, wherein the power distribution system is contracted in the power transmission system point to satisfy an operational limitation of the power distribution system.

8. The power control system according to claim 1, wherein the power control amount is calculated so that a difference between an active power in the contraction power amount and an active power flow of the power distribution system is equal to or smaller than a first predetermined amount, and a difference between a reactive power in the contraction power amount and a reactive power flow of the power distribution system is equal to or smaller than a second predetermined amount.

9. A power control method in a power control system controlling a distributed energy resource connected to a power distribution system, comprising: collecting a control power amount range which is a control range of an active power amount and a reactive power amount of the distributed energy resource; contracting the power distribution system including the distributed energy resource in a power transmission system point to make the power distribution system serve as a contraction power distribution system using the control power amount range, and calculating a contraction control power amount range which is a control range of an effective power amount and a reactive power amount of the contraction power distribution system;

calculating a contraction power amount made up of an active power amount and a reactive power amount of the contraction power distribution system to satisfy the contraction control power amount range based on a power transmission system evaluation value indicating evaluation of a state of a power transmission system; calculating a power control amount made up of an active power amount and a reactive power amount controlled by the distributed energy resource based on the contraction power amount and a power distribution system evaluation value indicating evaluation of a state of the power distribution system; and transmitting the power control amount to the distributed energy resource.

10. The power control system according to claim 6, wherein the contraction power amount is calculated based on the power transmission system evaluation value as a target function.

11. The power control system according to claim 1, wherein one of an active power flow and a reactive power flow on a primary side of a substation LRT is set to a fixed value, and another one of the active power flow and the reactive power flow is set to a target function to calculate the contraction control power amount range.

* * * * *